United States Patent [19]
Hill

[11] 3,815,959
[45] June 11, 1974

[54] INDUSTRIAL ROLLER OR WHEEL

[76] Inventor: Menno E. Hill, 806 Harbor Island, Clearwater, Fla. 33515

[22] Filed: Aug. 8, 1972

[21] Appl. No.: 278,746

[52] U.S. Cl............................ 301/63 PW, 308/190
[51] Int. Cl............................................. B60b 5/02
[58] Field of Search........... 301/63 PW, 63 DS, 5 R, 301/5.3, 5.7; 308/190, 191, 16; 152/327, 329, 313, 314, 323; 16/18 R, 45, 46, DIG. 27

[56] References Cited
UNITED STATES PATENTS

| | | | |
|---|---|---|---|
| 540,478 | 6/1895 | De Sparre | 152/327 |
| 880,921 | 3/1908 | Rosenberg | 301/39 R |
| 918,684 | 4/1909 | Macbeth | 152/327 |
| 1,169,984 | 2/1916 | Mettler | 152/327 |
| 1,625,644 | 4/1927 | Fisher | 152/327 |
| 2,437,907 | 3/1948 | Casper | 16/46 |
| 2,742,663 | 4/1956 | Meadows | 16/45 |
| 2,848,278 | 8/1958 | Todd | 301/63 DS |
| 3,026,153 | 3/1962 | Judd | 16/46 |
| 3,114,408 | 12/1963 | Ross | 152/323 |
| 3,194,293 | 7/1965 | Kindley | 301/5 R |
| 3,533,662 | 10/1970 | Richards | 308/191 |

FOREIGN PATENTS OR APPLICATIONS

| | | | |
|---|---|---|---|
| 1,505,202 | 8/1969 | Germany | 152/323 |
| 13,884 | 6/1907 | Great Britain | 16/46 |
| 446,208 | 1/1948 | Canada | 301/63 PW |
| 453,822 | 6/1925 | Germany | 152/327 |

Primary Examiner—Richard J. Johnson
Assistant Examiner—Reinhard J. Eisenzopf
Attorney, Agent, or Firm—B. P. Fishburne, Jr.

[57] ABSTRACT

A roller or wheel particularly adaptable to the elevator and moving stairway industries, as well as other like industrial uses. The roller features an elastomeric tire and a low friction bearing support for the tire constructed and arranged so that the assembly allows the natural movement of the tire material, thus preventing generation of high heat and therefore stands up under long periods of usage and typical industrial loadings. Critical features include a relief zone between the tire and bearing support and a certain interference fit between the elastomeric tire and bearing support which factors coact to prevent heat build-up with resulting destruction of the assembly.

2 Claims, 7 Drawing Figures

PATENTED JUN 11 1974　　3,815,959
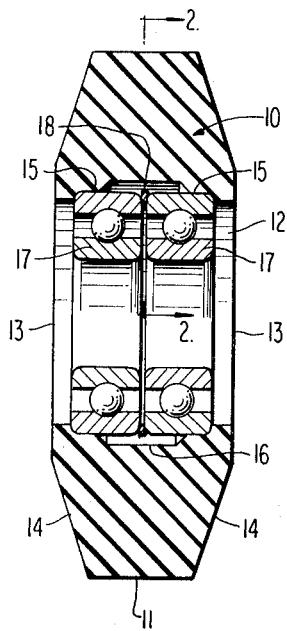
FIG.1
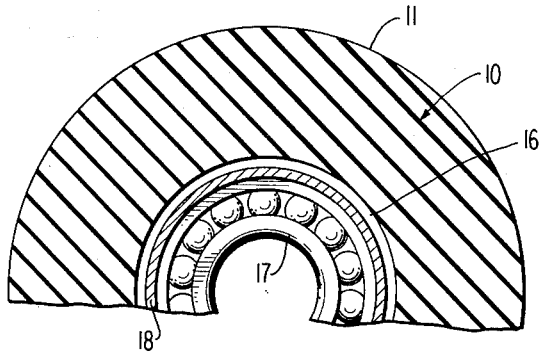
FIG.2
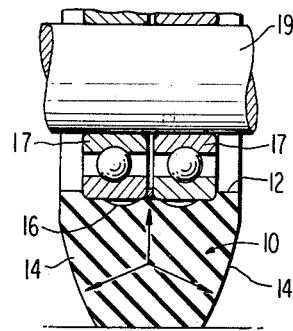
FIG.3
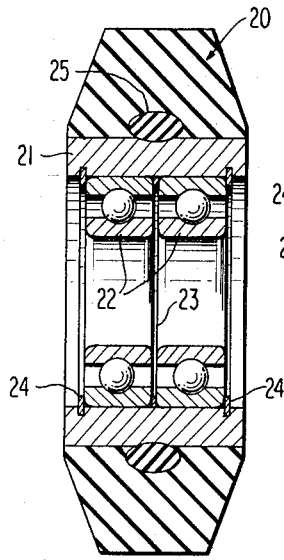
FIG.4
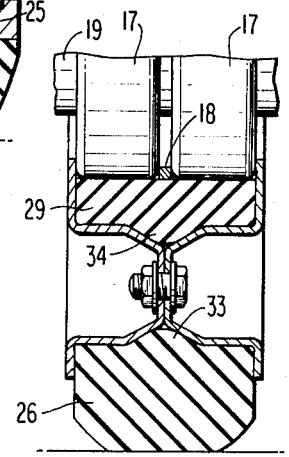
FIG.5
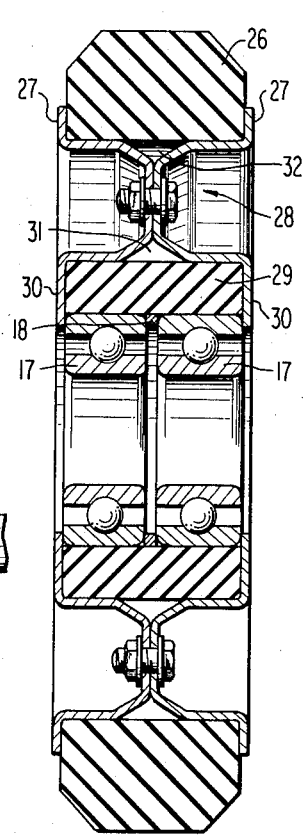
FIG.6
FIG.7

INDUSTRIAL ROLLER OR WHEEL

A definite need exists for an economical and reliable guide roller for the moving stairway industry, the passenger and freight elevator industry and for similar industrial applications. Guide rollers of the type envisioned are subjected to high load operation, and particularly high speeds in the elevator industry, over long periods of time and, to be practical, must obviously be capable of standing up without failure for considerable time intervals. One major problem leading to the inevitable destruction of industrial guide rollers is the effect of heat generated by internal friction in the elastomeric tire which builds up in the assembly causing destruction of the bond between the tire and its bearing support, ultimately drying up the bearing lubricant and burning out the bearing itself, such as a ball bearing. Known prior art rollers or wheels for use on elevators, moving stairways and the like have fallen far short of what has been desired in terms of length of service before replacement is necessary. The all too frequent requirement to replace these industrial guide rollers in the field results in excessively heavy maintenance costs in terms of labor and material, not to speak of costly down time for expensive equipment.

In view of the above, any significant improvement in the useful life of an industrial roller of this type would constitute a substantial advance in the art and therefore the objective of this invention is to provide just such an improved industrial roller or wheel capable of high speed operation over long periods without failure caused primarily by a build-up of heat. The roller embodied in the invention possesses a unique ability to prevent generation of high heat and therefore avoid destruction due to the ultimate effective heat on material bonds, bearing lubricants and other heat-sensitive components. The improved roller features a relief zone between the elastomeric tire and the metal bearing support structure and also features a particular combination of materials and a precisely specified interference fit between the tire and bearing support structure, which factors contribute to the efficient flow of materials, the releasing of preloaded stresses and the minimizing of heat build-up during the operation of the roller.

In actual tests of the invention simulating the application on a high speed elevator, the guide roller was operated in excess of ten thousand miles under typical conditions and after the test was as good as new. The reason for this exceptional service, far in excess of expected useful life for known prior art devices, was the ability of the roller to keep running cool at all times due to its constructional features. It is believed that the actual useful life of the roller or wheel embodying the invention is many times the above test life and far in excess of anything known in the prior art of a comparable cost and for a comparable purpose.

Other features and advantages of the invention will become apparent during the course of the following detailed description.

BRIEF DESCRIPTION OF DRAWING FIGURES

FIG. 1 is a central vertical section through an industrial roller or wheel embodying the invention according to one preferred embodiment.

FIG 2 is a fragmentary vertical section taken on line 2—2 of FIG. 1.

FIG. 3 is a fragmentary view similar to FIG. 1 showing the behavior of the roller under typical loading conditions.

FIG. 4 is a cross sectional view, similar to FIG. 1, showing a modification of the invention.

FIG. 5 is a fragmentary vertical section similar to FIG. 3 depicting the roller of FIG. 4 under loading.

FIG. 6 is a central vertical section through a roller or wheel embodying a further modification.

FIG. 7 is a fragmentary vertical section depicting the roller in FIG. 6 under typical loading.

DETAILED DESCRIPTION

Referring to the drawings in detail and referring first to FIGS. 1 through 3 showing a preferred embodiment of the invention, an industrial guide roller comprises a solid resilient tire 10 preferably formed of polyurethane or equivalent material having a durometer of 85-95 hardness Shore A. A satisfactory material for the molded tire 10 is DuPont "Adiprene" 167.

The molded tire 10 has a true cylindrical periphery 11 and a nominally sized bore 12 whose diameter is not critical. The side faces of the tire are symmetrically beveled preferably approximately 30° from each opposite end face 13 of the roller as indicated at 14. Inwardly of the end faces 13, the cylindrical bore 12 is undercut to form a pair of equal diameter concentric cylindrical seats or lands 15 for ball bearings, to be described. These cylindrical surfaces 15 are concentric with the periphery 11 to a fairly high degree, such as within 0.002 inch total runout. The diameter of the seats 15 is also somewhat critical in the invention and is held to a close tolerance in the molding of the tire 10. Between the seats 15 at the axial center of the tire 10 is a further undercut cylindrical bore portion 16 forming a relief chamber in the resilient tire. As will be described, this relief chamber is an important feature of the invention. In the case of a 3-½ inch outside diameter roller, the relief chamber 16 will be approximately one-half inch wide axially. The radial depth of the chamber 16 for the same size of roller is approximately 0.075 inch measured from the walls of the seats 15. All of these sizes or dimensions will of course vary as the nominal size of the roller varies. Again, for a roller which is nominally 3-½ inches in outside diameter, the diameter of the seats 15 will be approximately 1.550 inches.

The industrial roller further comprises an internal bearing assembly preferably composed of a pair of ball bearings 17 and a thin intervening spacer washer 18. In some cases, a single ball bearing may be utilized or a ball bearing in combination with a sleeve bearing. Preferably, the ball bearing 17 is a single row deep groove labyrinth plate seal bearing tested and selected for quietness. It has a single seal toward the outside. The entire bearing package consisting of the two ball bearings 17 with seals and the washer 18 may be purchased from Norma Hoffman. The bearings 17 should contain lithium grease to 60–80 percent of capacity.

The bearing-washer assembly is pressed into place in the molded tire 10 until the ball bearings are seated properly on the seats 15. There is an interference fit of approximately 0.020 inch between the seats 15 and outer bearing races for maximum efficiency. This fit will be varied somewhat in relation to the hardness of the tire. It will also vary in accordance with the nominal size of the roller or wheel, and the fits specified herein are for nominally sized 3-½ inch tires or rollers.

With the parts of the roller assembled as described, if the tire 10 does not run true, the outside diameter of the tire may be turned to render it true with a single point tool. The roller assembly produced in accordance with the above description should be able to operate continuously under a 250 lb. load for at least 25,000 miles without failure.

FIG. 3 shows the industrial roller under a normal load produced through a shaft 19 engaging through the ball bearings 17. As the tire 10 is compressed under load, the natural flow of the elastomer is from the center of mass toward the relief chamber 16 and toward the beveled faces 14. The flowing material substantially closes the relief chamber 16 as rolling takes place except for small regions directly under the two ball bearings. Simultaneously, bulging of the beveled faces 14 takes place as depicted in FIG. 3. The cross sectional shape of the tire and particularly the relief chamber 16 greatly reduces internal friction by allowing the elastomer to flow in all directions or to do what comes naturally to it during rolling movement on a solid surface. This natural movement of the elastomer with a great reduction of friction minimizes heat build-up and prevents radial compression from being projected into longitudinal or circumferential flow during rolling which would otherwise tend to pyramid heat generation due to internal friction. Additionally, the described interference fit of the ball bearings with the tire at the seats 15 has the property of balancing out of forces in the load area before circumferential forces start to act appreciably, thus again minimizing heating.

The combined action of the particular material used for the tire 10, the particular bearing support means, the interference fit of the bearings in the tire, the cross sectional shape of the tire, and above all the relief chamber at the location shown imparts to the industrial roller its remarkable ability to avoid overheating or to dissipate heat and to run cool under relatively heavy loadings for great distances and under continuous operation for great lengths of time without overheating or destruction. Without the enumerated features of the invention, as with conventional devices, the heat due to internal friction would build up rapidly and cause deterioration in the areas where the bearings are seated in the tire and gradually the bearing lubrication would dry up due to heating and the bearing itself would be destroyed. While the differences in construction over conventional arrangements may appear minor at first glance, they are in fact highly significant and highly important in practice and fairly critical in terms of dimensions and materials employed. The resulting industrial roller or wheel is rendered much more efficient and economical due to a longer life without failure caused by heat.

FIGS. 4 and 5 show a modified form of roller wherein the elastomeric tire 20 is bonded to an intermediate cylindrical rigid hub or sleeve 21 which in turn receives ball bearings 22 or equivalent bearing means in the bore of the hub. FIG. 4 depicts the same pair of single row ball bearings and intermediate spacer ring 23 described in connection with FIGS. 1–3. Conventional outside bearing retainers 24 are also provided and these are seated in suitable grooves in the hub 21.

The elastomeric tire 20 may again be formed of polyurethane having a durometer of 85–95 hardness Shore A. In lieu of the empty relief chamber 16, the relief effect is obtained in the same region of the tire by providing a relatively small cross section annular mass of relatively soft elastomer as indicated by the numeral 25. For example, the mass 25 shown relaxed in FIG. 4 and being oval in cross section may consist of polyurethane with a durometer of about 50–60 hardness Shore A as compared to 85–95 hardness.

During the operation of the industrial roller as shown in FIG. 5, the results in terms of coolness of operation and durability in service are comparable to the results obtained in the previously-described embodiment. The mode of operation is substantially the same as previously described except that when the tire 20 is compressed, the softer material 25 is squeezed locally into the arcuate formation shown approximately in FIG. 5 during the rolling action of the wheel. This natural flow of material reduces friction and prevents heat build-up in the normally most critical region where internal friction caused by rolling is the greatest. With the use of the soft material 25, heat is minimized to such an extent that the bond between the tire 20 and hub 21 is not destroyed nor is the bearing lubricant destroyed or dried up so as to cause failure during operation.

It may be mentioned that some further variations are contemplated in the constructions already described. For example, in FIG. 1, a plain sleeve bearing could be employed instead of the ball bearings 17. Also, in lieu of the relief chamber 16 and the corresponding soft relief material 25, a roughly similar heat dissipating means might be formed in the tire 10 or 20 by the provision therein at regularly circumferentially spaced intervals of slots or openings, not shown, which extend axially through the elastomeric material between the tread surface 11 and the bearing mounting portions of the tire. Such through slots or openings in the tire could be varied in cross sectional size and shape and could also be varied in number. These openings, if employed, would serve the general purpose of the described relief chamber and soft center relief material 25.

FIGS. 6 and 7 show another modification of industrial roller particularly suited for certain electric stairway wheel guides. In these figures, a tire 26 of polyurethane or the like having a hardness comparable to the tires already described is mounted with a snug interference fit, such as 0.010 inch, between the side flanges 27 of a rigid wheel structure 28 constructed as shown. An annular bearing cushion 29 preferably of similar material to the tire 26 is similarly press-fitted between the flanges 30 of the wheel 28. The same assemblage of ball bearings 17 described in FIG. 1 may be employed in the construction of FIGS. 6 and 7 with these bearings pressed into the cushion element 29 and retained therein by the side flanges 30 of the wheel 28.

A pair of concentric relief chambers 31 and 32 is provided adjacent the periphery of the cushion element 29 and the bore of the tire 26, both chambers being at the axial center of the wheel and tapering in opposite directions cross sectionally, FIG. 6. Depicted in FIG. 7 with the roller under load, the material of the compressed tire 26 and cushion element 29 will flow into the relief chambers 31 and 32 in the manner shown at 33 and 34 in FIG. 7 for the same purpose specified in the prior embodiments, namely, to suppress the development of excessive heat in the roller, thus preventing deterioration or break-down. The advantages obtained are roughly the same as those previously described and no further description should be necessary for a proper understanding of the invention as contained in FIGS. 6 and 7.

In all forms of the invention, therefore, the desired cool running of the industrial roller is achieved by a carefully chosen combination of materials, fitting together of components and the prevention of heat build-up due to internal friction by providing some form of relief channel for the natural flow of elastomer during compression. This is the channel 16 in FIG. 1, the soft portion 25 in FIG. 4 and the two channels 31 and 32 in FIG. 6. By allowing the tire elastomer to flow locally and continuously in this manner while under load, internal molecular friction is drastically reduced in the most critical area of the assembly.

With respect to the embodiment shown in FIG. 1, the dimensions of the tire 10 and bearings are such that the tire will firmly hold the bearings but there will be no break-down of the parts or damage when the bearings are forced into place. For accuracy, the tire is made by molding it with a metal core in place and this core is pressed out of the tire when it is cool.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. An industrial roller or wheel comprising in combination a solid elastomer tire having a durometer of 85-95 hardness Shore A engageable with a guiding surface during use, a mechanical bearing support means mounted directly in said tire and including an axial bore adapted to receive a shaft, and means forming an annular relief chamber at the interfaces of said tire and bearing support means and near the axial center of the tire, whereby the tire elastomer when compressed by rolling under load may flow naturally and continuously into said annular relief chamber, said bearing support means comprising a ball bearing assembly having a direct interference fit in the bore of the elastomer tire, said tire bore having an undercut cylindrical seat receiving the ball bearing assembly in interference fitting relationship, there being a pair of ball bearing retaining shoulders on the tire immediately outwardly of said seat, and said relief chamber comprising a further undercut annular groove in the bore of the tire at the axial center thereof dividing said seat into two separated annular seat portions.

2. The structure of claim 1, and said ball bearing assembly comprising a pair of single row ball bearings whose outer side portions engage the seat portions and whose inner sides project axially across the groove forming said relief chamber.

* * * * *